3,830,700
TEST FOR β - LACTAMASE ACTIVITY USING CHROMOGENIC CEPHALOSPORIN COMPOUND
Cynthia Hilda O'Callaghan and John Colin Clark, Gerrards Cross, England, James Kennedy, Montrose, Scotland, Susan Mary Kirby, Iver Heath, Alan Gibson Long, Greenford; Allan Morris, Bagshott and Anthony Harold Shingler, and Niall Galbraith Weir, London, England, assignors to Glaxo Laboratories Limited, Greenford, England
No Drawing. Filed Oct. 3, 1972, Ser. No. 294,649
Claims priority, application Great Britain, Oct. 7, 1971, 46,798/71
Int. Cl. C12k 1/00; G01n 31/22
U.S. Cl. 195—103.5 R                                  7 Claims

ABSTRACT OF THE DISCLOSURE

Cephalosporin compounds having the formula

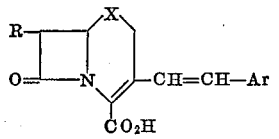

where R is amino or blocked amino, X is —S—, —SO— (α or β) or —SO$_2$—, and Ar is a carbocycle or a heterocycle substituted by at least one electron withdrawing substituent in conjugation with the exocyclic —CH=CH— double bond, and salts and esters are useful chromogenic agents for the detection of β-lactamase activity. Test reagents containing such compounds are also disclosed.

---

The invention concerns improvements in cephalosporin compounds. More particularly the invention concerns chromogenic cephalosphorin compounds which are of interest as test reagents in the fields of pathology, biochemistry and analytical chemistry.

The cephalosporin compounds referred to in this Specification are generally named with reference to cepham (see *J. Amer. Chem. Soc.* 1962, 84, 3400).

It is known that the β-lactam ring in cephalosporin compounds can be opened either biochemically by β-lactamases (produced, for example, by certain strains of cephalosporin-resistant bacteria) or chemically, e.g. by bases or acids. We have now discovered a group of cephalosporin compounds which, upon opening of the β-lactam ring, give coloured products. These compounds are therefore capable of use as sensitive test reagents for agents causing opening of the β-lactam ring.

One aspect of the invention provides a method of testing a biological sample, particularly a bacterial culture, for β-lactamase activity which comprises contacting said sample in the presence of water with a compound of general formula:

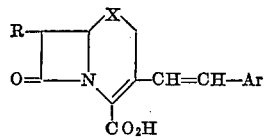

wherein R is an amino group or a blocked amino group e.g. an acylamido group, Ar is an aromatic group bearing at least one electron-withdrawing group in conjugation with the exocyclic —CH=CH— double bond and X is —S—, —SO— (α or β) or —SO$_2$—; or a carboxylate derivative thereof e.g. a salt or a water-soluble ester.

Salts of the compound (I) of principal interest include alkali metal salts, e.g. sodium and potassium; and ammonium salts.

A wide range of blocked amino groups may be present as the group R in formula I, the characterising feature of the cephalosporin compounds used in the invention being the nature of the 3-position substituent. Thus R may be, for example an alkanoylamido or carbocyclic or heterocyclic aralkanoylamido or aryloxyalkanoylamido group. In general where R is acylamido the group preferably contains 1-20 carbon atoms, the acyl portion corresponding to, for example, one of the specific acyl groups illustrated in the following list, which is not, however, intended to be exhaustive:

(i) $R^u C_n H_{2n} CO$— where $R^u$ is aryl (carbocyclic or heterocyclic), cycloalkyl, substituted aryl, substituted cycloalkyl, cycloalkadienyl, or a non-aromatic or meso-ionic group, and $n$ is an integer from 1–4. Examples of this group include phenylacetyl; substituted phenylacetyl e.g. fluorophenylacetyl, nitrophenylacetyl, aminophenylacetyl, acetoxyphenylacetyl, methoxyphenylacetyl, methylphenylacetyl, or hydroxyphenylacetyl; N,N-bis (2-chloroethyl) aminophenylpropionyl; thien-2- and -3-ylacetyl; 4-isoxazolyl and substituted 4-isoxazolylacetyl; pyridylacetyl; furylacetyl; tetrazolylacetyl; cyclohexadienyl; or a sydnoneacetyl group. The substituted 4-isoxazolyl group may be a 3-aryl-5-methyl isoxazol-4-yl group, the aryl group being e.g. phenyl or halophenyl e.g. chloro- or bromo- phenyl. An acyl group of this type is 3-o-chlorophenyl-5-methyl isoxazol-4-yl-acetyl.

(ii) $C_n H_{2n+1} CO$— where $n$ is an integer from 1–7. The alkyl group may be straight or branched and, if desired, may be interrupted by an oxygen or sulphur atom or substituted by e.g. a cyano group, a carboxy group, an alkoxycarbonyl group, a hydroxy group or a carboxycarbonyl group (—CO.COOH). Examples of such groups include acetyl, cyanoacetyl, hexanoyl, heptanoyl, octanoyl and butylthioacetyl.

(iii) $C_n H_{2n-1} CO$— where $n$ is an integer from 2–7. The alkenyl group may be straight or branched and, if desired, may be interrupted by an oxygen or a sulphur atom. An example of such a group is allylthioacetyl.

(iv)

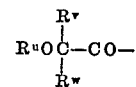

where $R^u$ has the meaning defined under (i) and in addition may be benzyl, and $R^v$ and $R^w$ which may be the same or different each represent hydrogen, phenyl, benzyl, phenethyl or lower alkyl. Examples of such groups include phenoxyacetyl, 2-phenoxy-2-phenylacetyl, phenoxypropionyl, 2-phenoxybutyryl, benzyloxycarbonyl, 2-phenoxypropionyl, 2-phenoxybutyryl, methylthionphenoxyacetyl.

(v)

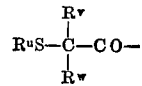

where $R^u$ has the meaning defined under (i) and, in addition, may be benzyl and $R^v$ and $R^w$ have the meanings defined under (iv). Examples of such groups include S - phenylthioacetyl, S - chlorophenylthioacetyl, S-fluorophenylthioacetyl, pyridylthioacetyl, and S-benzylthioacetyl.

(vi) $R^u Z(CH_2)_m CO$— where $R^u$ has the meaning defined under (i) and, in addition, may be benzyl, Z is an oxygen or sulphur atom and $m$ is an integer from 2–5. An example of such a group is S-benzylthiopropionyl.

(vii) $R^u CO$— where $R^u$ has the meaning defined under (i). Examples of such groups include benzoyl, substituted benzoyl (e.g. aminobenzoyl), 4-isoxazolyl- and substituted 4-isoxazolylcarbonyl, cyclopentanecarbonyl, sydnonecarbonyl, naphthoyl and substituted naphthoyl (e.g. 2-ethoxynaphthoyl), quinoxalinylcarbonyl and substituted quinoxalinylcarbonyl (e.g. 3-carboxy-2-quinoxalinylcarbonyl). Other possible substituents for benzoyl include alkyl, alkoxy, phenyl, carboxy, alkylamido, cycloalkylamido, allylamido, phenyl(lower)alkyl amido, morpholinocarbonyl, pyrrolidinocarbonyl, piperidinocarbonyl, tetrahydropyridino, furfurylamido or N-alkyl-N-anilino, or derivatives thereof, and such substituents may be in the 2- or 2- and 6- positions. Examples of such substituted benzoyl groups are 2,6-dimethoxybenzoyl, 2-methylamidobenzoyl and 2-carboxybenzoyl. Where the group $R^u$ represents a substituted 4-isoxazolyl group, the substituents may be as set out above under (i). Examples of such 4-isoxazolyl groups are 3-phenyl-5-methyl-isoxazol-4-yl carbonyl, 3-o-chlorophenyl-5-methyl-isoxazol-4-yl carbonyl and 3-(2,6-dichlorophenyl)-5-methyl-isoxazol-4-yl carbonyl.

(viii)

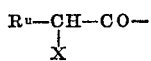

where $R^u$ has the meaning defined under (i) and X is amino, substituted amino (e.g. acylamide or a group obtained by reacting the α-aminoacylamido group of the 7-side chain with an aldehyde or ketone e.g. acetone, methylethylketone or ethyl acetoacetate), hydroxy, carboxy, esterified carboxy, triazolyl, tetrazolyl, cyano, halogeno, acyloxy (e.g. formyloxy or lower alkanoyloxy) or etherified hydroxy group. Examples of such acyl groups are 2-amino-2-phenylacetyl, and 2-carboxy-2-phenylacetyl.

(ix)

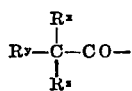

where $R^x$, $R^y$ and $R^z$ which may be the same or different may each represent lower alkyl, phenyl or substituted phenyl or $R^x$ represents hydrogen. An example of such an acyl group is triphenylcarbonyl (x)

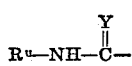

where $R^u$ has the meaning defined under (i) and in addition may be hydrogen, lower alkyl or halogen substituted lower alkyl, and Y represents oxygen or sulphur. An example of such a group is $Cl(CH_2)_2NHCO$.

(xi)

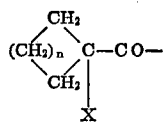

where X has the meaning defined under (viii) above and n is an integer of from 1 to 4. An example of such an acyl group is 1-aminocyclohexanecarbonyl.

(xii) Amino acyl, for example

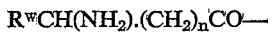

where n is an integer from 1–10, or $NH_2$.

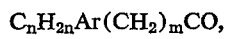

where m is zero or an integer from 1–10, and n is 0, 1 or 2, $R^w$ is a hydrogen atom or an alkyl, aralkyl or carboxy group or a group as defined under $R^u$ above, and Ar is an arylene group, e.g. p-phenylene or 1,4-naphthylene. Examples of such groups are disclosed in British Patent Specification No. 1,054,806. A group of this type is the p-aminophenylacetyl group. Other acyl groups of this type include those, e.g. D-5-amino-5-carboxypentanoyl, derived from naturally occurring amino acids and derivatives thereof e.g. N-bonzoyl-β-aminoadipoyl.

(xiii) Substituted glyoxylyl groups of the formula

where Ry is an aliphatic, araliphatic or aromatic group, e.g. a thienyl group, a phenyl group, or a mono-, di- or tri- substituted phenyl group, the substituents being, for example, one or more halogen atoms (F, Cl, Br, or I), methoxy groups, methyl groups or amino groups, or a fused benzene ring. Included in this group are also the α-carbonyl derivatives of the above substituted glyoxylyl groups e.g. the α-hydroxyimino, α-alkoxyimino and α-acyloxyimino derivatives. An example of such an α-carbonyl derivative is the 2-hydroxyimino-2-phenylacetyl group.

(xiv) Formyl.

(xv) Hydrocarbyloxycarbonyl and substituted hydrocarbyloxycarbonyl groups (wherein the 7-amino group forms part of a urethane), in particular lower alkoxycarbonyl groups (such as methoxycarbonyl, ethoxycarbonyl and, most preferably, t-butoxycarbonyl groups); halo lower alkoxycarbonyl groups e.g. 2,2,2-trichloroethoxycarbonyl; aralkoxycarbonyl groups such as benzyloxycarbonyl, 4 - methoxybenzyloxycarbonyl, diphenylmethoxycarbonyl and 4-nitrobenzyloxycarbonyl groups. Cycloalkoxycarbonyl groups may also be used, e.g. the adamantyloxycarbonyl group.

(xvi) Haloformyl e.g. chloroformyl.

The nucleus of the aromatic group Ar in formula (I) may be carbocyclic or 5- or 6-membered heterocyclic containing one or more heteroatoms selected from O, N and S. Examples of such nuclei are: phenyl, naphthyl, thienyl, pyridyl and furyl. As electron-withdrawing substituents nitro groups are preferred; other electron-withdrawing substituents include cyano groups, formyl groups, alkylcarbonyl groups and alkoxycarbonyl groups, of which lower ($C_1$–$C_4$) alkylcarbonyl and lower ($C_1$–$C_4$) alkoxycarbonyl groups are preferred, e.g. acetyl, carbethoxy or carbomethoxy.

It is desirable to have two or more electron-withdrawing groups present in the group Ar particularly if the individual electron-withdrawing effect of each of said groups is not large.

Where the aromatic group present in Ar is a phenyl group, the electron-withdrawing group or groups are situated at the ortho- and/or para- positions to ensure maximum conjugation with the —CH=CH— double bond. Where Ar contains a heterocyclic aromatic group the electron-withdrawing group or groups are also positioned to ensure conjugation.

Preferred compounds are those in which Ar is 4-nitrophenyl, 2 - nitrophenyl, 2,4 - dinitrophenyl or 2,6-dinitrophenyl. All of these compounds give an orange or red colour when the β-lactam ring is opened. The 2,4-dinitrophenyl compounds give a particularly strong and characteristic red colour. A compound of particular interest is that in which Ar is 2,4-dinitrophenyl and R is thienylacetamido, i.e. (NR7R) - 3 - (E-2,4 - dinitrostyryl)-7-(2-thienylacetamido)ceph - 3 - em - 4 - carboxylic acid, of the structure:

(II)

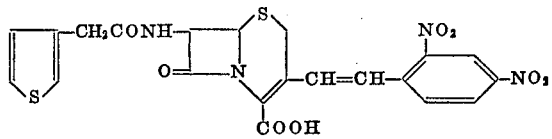

and salts thereof.

Compounds wherein Ar is 4-cyanophenyl may be employed if for any reason a green colour is preferred.

Compounds of general formula I fall within the general class of compounds disclosed in our Belgian Pat. No. 761,897 (Cognate British Patent Applications 3,464/70, 21,907/70 and 28,194/70) but the only compounds specifically disclosed therein in which Ar is an aromatic group bearing at least one electron-withdrawing group are those in which the group Ar is 4-nitrophenyl.

Thus a further aspect of the present invention provides as new compounds, compounds of general formula I and carboxylate derivatives e.g. salts and water-soluble esters thereof as defined above with the proviso that Ar is not 4-nitrophenyl. Advantageous compounds according to the invention are those wherein Ar is 2,4-dinitrophenyl.

The novel compounds may be prepared by the general methods disclosed in our aforementioned Belgian Patent, i.e. by (a) reacting a compound of formula

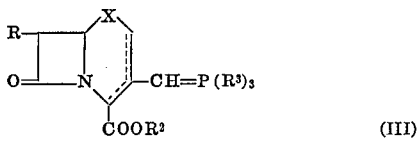

(wherein R and X are as defined above, $R_2$ is hydrogen or a carboxyl-blocking group, and $R^3$ is an organic substituting group) with an aldehyde compound of formula ArCHO (wherein Ar has the meaning defined above but is not 4-nitrophenyl); or (b) reacting a compound of the formula

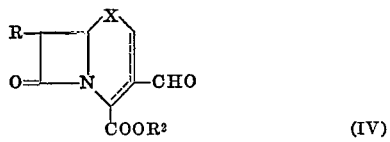

(wherein R, X and $R^2$ are as defined in (a) above) with a phosphorane ylid of the formula

$$(R^3)_3P=CHAr \quad (V)$$

(wherein $R^3$ and Ar are as defined in (a) above); whereafter, if necessary or desired, any of the following reactions (c) are carried out:

(i) conversion of a $\Delta^2$ isomer into the desirbed $\Delta^3$ isomer;
(ii) reduction of a compound in which X is —SO— to the compound in which X is —S—;
(iii) oxidation of a compound in which X is —S— to the compound in which X is —SO— or —$SO_2$— or oxidation of a compound in which X is —SO— to the compound in which X is —$SO_2$—;
(vi) conversion of a blocked amino group R to a free amino group;
(v) reaction of a compound where R is a free amino group with a reagent serving to convert said amino group to a blocked amino group, e.g. with an acylating derivative of a carboxylic acid;
(vi) isomerisation (cis↔trans) of the exocyclic

—CH=CH— double bond;
(vii) removal of a carboxyl-blocking group from the 4-carboxyl group and/or removal of any groups protecting any amino or carboxyl groups present in a blocked amino group R; and/or
(viii) formation of a carboxylate derivative, e.g. a salt or water-soluble ester, of the 4-carboxyl group.

Depending on the pattern and nature of substitution in the group Ar in formula (I) either the cis or trans isomer may be advantageous in the sense of giving a somewhat deeper and more intense colour than the other isomer or alternatively by virtue of improved water solubility. Generally, however, trans isomers are preferred. Isomerisation may be effected by suitable chemical treatment, e.g. with trifluoroacetic acid and anisole or by irradiation.

The method of testing a biological sample which forms one aspect of this invention is of particular interest for testing for β-lactamase activity, especially in bacterial cultures. It is known that the resistance of some strains of bacteria to the antibacterial action of cephalosporin and penicillin compounds is due to β-lactamase enzymes elabo- rated by the bacteria, the enzymes sufficing to degrade and inactivate the cephalosporins and penicillins at normal dosage levels. Hitherto the identification of such strains of bacteria has been a matter of difficulty generally requiring the growth of a culture, incubation with a β-lactam compound and finally addition of a further reagent to give a colour indication of the presence of the ring-opened lactam.

The present invention, by contrast, provides a rapid and positive indication of β-lactamase activity. All that is required is to contact the bacterial culture with a compound of general formula I or derivative thereof; in the case of a culture containing a high concentration of an active β-lactamase, a colour will be observed almost at once; if no colour results after 30 minutes incubation at 37° with the test compound, it can be concluded that β-lactamase activity is very low or absent.

The electron-withdrawing substituent or substituents in the group Ar render the β-lactam ring particularly labile, and therefore a bacterial strain which does not give a positive indication of β-lactamase activity with the test compound is unlikely to produce ring-opening of any chemotherapeutically significant cephalosporin or penicillin compound.

The production of a colour is a valuable feature of the invention, since β-lactamase activity can be assessed qualitatively without recourse to spectrophotometers or other optical instruments.

The application of a compound of general formula (I) to the sample may be performed in various ways. In the case of bacterial cultures, one or more drops of test solution (the solvent normally being water, if desired in admixture with a minor amount of an organic solvent e.g. dimethylformamide or dimethylsulphoxide) may be added to a sample of broth or dropped on an agar plate.

The test can be made quantitative by standardising the concentrations and volumes of sample and test reagent and the incubation period, the intensity of colour being measured either by a spectrophotometer or by some form of optical comparator.

The colour developed on an agar plate is unstable and begins to fade in about 3 hours at 37°. Colours given by broth culture are normally stable for at least 24 hours. It is recommended that the test be read after 30 minutes and before 3 hours from the time of adding the reagent.

It should be appreciated that the compounds of general formula I have antibacterial activity, and therefore an attempt to culture an organism in the presence of the test compound may not result in a satisfactory test of β-lactamase activity, particularly in the case of gram-positive bacteria; ordinarily one will grow the culture and then treat it with the test compound. This mode of treatment is particularly appropriate in the case of agar cultures.

Very often only a qualitative indication of β-lactamase activity is needed, and for this it is convenient to employ the test compound impregnated into an absorbent member of any convenient size or shape, composed e.g. of absorbent cellulose material, e.g. paper. Conveniently this member may be in the form of a disc of thick paper which may be dropped onto an agar culture, thus avoiding the handling of a solution of test reagent. For use with broth cultures or other liquid samples the absorbent member is conveniently in elongated form for dipping in the sample. The provision of test reagents impregnated into discs or sticks is well known per se. The impregnation will generally be performed with an aqueous solution of the test compound or preferably a salt thereof. If the water solubility is insufficient, an organic solvent e.g. dimethylformamide may be used, either alone or in aqueous solution. The concentration of impregnating solution necessary to give a satisfactory colour change with any given reagent can easily be determined by experiment. Concentrations of the order of 1 mg./ml. are usually satisfactory. Finally the solvent will be evaporated by gentle heating, if desired under reduced pressure.

The absorbent members should be white or pale so that the colour produced on testing is not obscured. It is desirable to prevent excessive exposure to light before use by suitable packaging.

Accordingly a still further aspect of the invention provides a test material for use in testing for β-lactamase activity which comprises a white or pale absorbent member, e.g. paper, impregnated with a compound of general formula I or a water soluble carboxylate derivative, e.g. a salt, thereof.

Also provided by the invention is an analytical reagent for testing for β-lactamase activity comprising a solution of a compound of general formula I or a derivative thereof at a concentration of 10–2000 μg./ml., e.g. 50–250 μg./ml., preferably in water or water containing a minor amount, e.g. 0.1–10% v./v., of an organic solvent such as dimethylformamide or dimethylsulphoxide.

The present invention is of interest in relation to pathology, when it is often desired to find out if a bacterial strain is capable of producing β-lactamase. This information influences the choice of antibiotic to be employed in combating the particular strain, apart from being relevant to the precise identification of the strain. A wide variety of bacteria, both gram-positive and gram-negative, known to produce β-lactamases were found to respond positively to the test procedure of this invention. Examples include *Enterobacter cloacae* P 99, *E. coli* TEM, *Klebsiella aerogenes* K1, *Staph. aureus, Pseudomonas aeruginosa* and *Bacillus licheniformis*. Gram-positive organisms tend to be sensitive to the antibacterial action of the test compound, and should always be cultured before being tested.

A further important use envisaged for the invention is in microbiological research, particularly into the transmissible R-factors which mediate β-lactamase production. R factors are extrachromosomal genetic elements responsible for transfer of antibiotic resistance from resistant bacteria to previously susceptible strains. The existence of this transfer mechanism is currently causing great concern in relation to the widespread use of antibiotics for relatively minor ailments and in animal feedstuffs. When transfer of resistance includes the ability to elaborate a β-lactamase, the present invention provides a simple means of indicating whether or not the R-factor is present.

Another possible use for the present invention is to indicate β-lactamase in the urine of patients having infections of the urinary tract caused by β-lactamase producing organisms.

Besides being a sensitive test for β-lactamases, the compound of general formula (I) and their salts also give a positive indication with certain other organic materials such as egg white and serum albumen. This should be borne in mind when testing for β-lactamase activity. The positive reaction is believed to be due to thiol groups in these materials. A positive test is also given by glutathione and mercaptoethanol. Thioglycollic acid gives a weak positive reaction. Of twenty amino acids tested only cysteine gave a positive reaction. Compounds containing thiomethyl on disulphide groups did not give a postive test.

As a result of this sensitivity of the test compounds to materials such as serum albumen it may be advantageous when testing for β-lactamase activity to test initially a blank, i.e. non β-lactamase containing, medium to ascertain that no such interfering material likely to produce spurious results is present.

When using the test reagents of the present invention it is preferred to employ a pH close to neutrality e.g. in the range 5.5 to 8.5. Extremes of pH degrade the reagent, and in the case of a test for β-lactamase activity also inactivate the enzyme.

In order that the invention may be better understood the following Examples are given by way of illustration only.

The following general information applies throughout the Examples, unless otherwise stated.

Light petrol was the fraction, b.p. 40 to 60° C. Proton magnetic resonance (PMR) spectra were measured at 100 mHz. Signs of coupling constants were not assigned. The integrals agreed with the structures assigned.

Electrophoresis was carried out on Whatman 3MM paper at pH 1.9 at a voltage gradient of *ca.* 25 volts/cm. Mobilities (M) (towards the cathode) are relative to dextran blue.

Column chromatography was performed on Merck Kieselgel (0.05–0.2 mm.).

Thin-layer chromatography was carried out upwards on Merck $GF_{254+366}$ silica plates, the following solvents were used for development:

System A: Upper phase of n-butanol:ethanol:water =4:1:5 equilibrated at room temperature.
System D: Benzene:ethyl acetate=5:1.
System E: Benzene:ethyl acetate=2:1.
System F: Chloroform:petroleum ether:acetone=20:5:1.

Paper chromatography was carried out in the following systems:

System B: Whatman No. 1 paper buffered to pH 6, downwardly developed at *ca.* 25° with top phase of n-butanol:ethanol:water=4:1:5, in equilibrium with bottom phase.

System C: Whatman No. 1 paper buffered to pH 5, downwardly developed at 37° with upper phase of n-butanol:ethyl acetate:0.1M-sodium acetate=1:8:8, in equilibrium with lower phase.

System B: is n-butanol:ethanol:water=4:1:5, equilibrated at room temperature, the upper phase being used as developer in descending manner, in equilibrium with lower phase, on Whatman 3MM paper buffered to pH 6 with 0.05M sodium dihydrogen phosphate.

System C: is ethyl acetate:n-butanol:O.LM-sodium acetate, pH 5=8:1:8, equilibrated at 38° C., the upper phase being used as developer in descending manner, in equilibrium with lower phase at 38° C., on No. 1 Whatman paper buffered to pH 5 with 0.1M sodium acetate.

These abbreviations are used for the appearances of the spots: s=strong, m=medium, f=faint.

PMR and IR spectra were consistent with the assigned structures.

The cephalosporin derivatives employed as starting materials in Examples 1(a) and 1(b) were prepared as described in our aforementioned copending cognate British Patent Applications (corresponding to Belgium Patent 761,897).

EXAMPLE 1

(A) Diphenylmethyl (6R,7R) - 3 - (2,4-Dinitrostyryl)-7-(2 - thienylacetamido) - ceph - 3 - em - 4 - carboxylate, *Z-isomer* (with *E-isomer*)

(a) A solution of 2,4-dinitrobenzaldehyde (9.8 g., 50 mmole) in dry methylene chloride (500 ml.) was stirred at *ca* 23°, and diphenylmethyl (6R,7R)-3-(triphenylphosphoranylidenemethyl) - 7 - (2-thienylacetamido)-ceph-3-em-4-carboxylate (7.65 g., 10 mmole) added, in portions, over 45 minutes. After stirring for a further 40 minutes, the solution was clarified by filtration through a pad of kieselguhr, concentrated to *ca.* 50 ml., and purified by chromatography on kieselgel (300 g.), with chloroform as eluent.

Evaporation of the eluate gave an oil (15.326 g.), which was dissolved in benzene (15 ml.), and this solution further purified by chromatography on kieselgel (300 g.), with benzene:ethyl acetate=10:1 as eluent.

Fractions with $R_f$ *ca.* 0.5 (System D) were combined and evaporated *in vacuo,* and the residual foam (4.226 g. 61.5%) triturated with ether (25 ml.) to give the *title ester* as yellow flakes (3.493 g. 51.2%), m.p. 88 to 108° (decomp.) $[\alpha]_D^{20}$ —443° (*c* 0.9, $CHCl_3$), $\lambda_{max.}$ (EtOH) 287 nm. (ε 11,300), and 375 nm. (ε 11,800), inflexion at 235 nm. (ε 24,700); the PMR spectrum ($CDCl_3$) indicated that this material was a mixture (*ca.* 85:15) of *Z-* and *E-isomers.*

(b) A solution of 2,4-dinitrobenzaldehyde (29.4 g. 0.15 mole) in methylene chloride (250 ml.) was vigorously stirred with saturated sodium bicarbonate:water=1:1 (750 ml.), and a solution of (6R,7R)-[4-diphenylmethoxycarbonyl - 7 - (2 - thienylacetamido) - ceph - 3-em-3-ylmethyl] triphenylphosphonium bromide (42.2 g. 0.05 mole) in methylene chloride (250 ml.) added, dropwise, over 30 minutes.

After stirring for a further 30 minutes, the organic phase was separated, concentrated to ca. 100 ml. and purified by chromatography on kieselgel (1.4 kg.), with methylene chloride (ca. 5 l.), followed by chloroform (ca. 13 l.) as eluents. Evaporation of the chloroform eluate gave a foam (40.8 g.), which was dissolved in benzene 40 ml.), and this solution further purified by chromatography on kieselgel (600 g.), with benzene:ethyl acetate =10:1 as eluent.

Fractions with $R_f$ ca. 0.5 (System D) were combined and evaporated *in vacuo*, the residual foam (19.7 g. 58%) triturated with ether (100 ml.), and the suspension filtered to give the *title ester* as orange flakes (15.765 g. 46.3%), m.p. 104 to 116° (decomp.), $[\alpha]_D^{20}$ −409° (c 1.12, CHCl₃), $\lambda_{max.}$ (EtOH) 287 nm. ($\epsilon$ 10,450), and 375 nm. ($\epsilon$ 17,000), inflexion at 235 nm. ($\epsilon$ 24,000); the PMR spectrum (CDCl₃) indicated that this sample was a mixture (ca. 4:1) of *Z*- and *E-isomers*.

The filtrate was evaporated *in vacuo*, the residue dissolved in ethyl acetate and the solution run into petroleum ether to give a second crop of the *title ester* as an amorphous, orange solid (1.344 g., 4%), m.p. 86 to 91° (decomp.), $[\alpha]_D^{20}$ −416° (c 1.1, CHCl₃), $\lambda_{max.}$ (EtOH) 280 nm. ($\epsilon$ 11,300), and 363 nm. ($\epsilon$ 10,600), inflexion at 235 nm. ($\epsilon$ 23,900); the PMR spectrum (CDCl₃) indicated that this material was mainly the *Z-isomer*.

The I.R. spectra, and chromatographic characteristics of both these samples were similar to those described in (a) above.

(B) 3 - (2,4,-Dinitrostyryl) (6R,7R)-7-(2-Thienylacetamido)-ceph-3-em-4-carboxylic acid, *E-isomer*

A solution of diphenylmethyl (6R,7R)-3-(2,4-dinitrostyryl) - 7-(2-thienylacetamido)-ceph-3-em-4-carboxylate (*Z-isomer* with ca. 20% *E-isomer*) (11.0 g., 16.1 mmole) in a mixture of trifluoroacetic acid (44 ml.) and anisole (11 ml.) was kept at 23° for 7 minutes, and the solvents removed at 40° (2 mm.).

Ethyl acetate (10 ml.) was added, the solution evaporated *in vacuo*, and the residue triturated with ether (75 ml.) to give the *title acid* as an orange solid (7.359 g., 88.6%), m.p. 103 to 113° (decomp.), $[\alpha]_D^{20}$ −224° (c 1.0, dioxan), $\lambda_{max.}$ (EtOH) 231 nm. ($\epsilon$ 24,300), 289 nm. ($\epsilon$ 10,300), and 386 nm. ($\epsilon$ 18,000), $\lambda_{max.}$ (0.1M–pH 6 phosphate buffer) 233 nm. ($\epsilon$ 22,200), 290 nm. ($\epsilon$ 12,200), and 391 nm. ($\epsilon$ 17,400), PMR spectrum (DMSO-d₆) include $\tau$ 2.37 and 2.72 (CH=CH, two doublets, J 16 Hz.), 4.73 (C₍₆₎—H, doublet, J 5 Hz.), and 5.94 and 6.26 (C₍₂₎—H, AB-quartet, $J_{AB}$ 18 Hz.). $R_f$ 0.42 (System B), and 0.82 (System C).

EXAMPLE 2

(A) Diphenylmethyl (2R,6R,7R)-3-iodomethyl - 7 - (2'-*t*-butoxycarbonylamino - 2' - phenylacetamido)ceph - 3-em-4-carboxylate A solution of diphenylmethyl (2'R,6R,7R)-3-chloromethyl-7-(2'-*t*-butoxycarbonylamino - 2' - phenylacetamido)ceph - 3 - em - 4 - carboxylate (43.7 g.) in acetone (250 ml.) was treated with a solution of sodium iodide (45 g.) in acetone (250 ml.). The mixture was stirred in the dark for 2 hours, then poured into dilute brine (2 l.), and the total extracted with ethyl acetate (2× 500 ml.). The extracts were washed with water and aqueous 1% sodium thiosulphate solution, then with further amounts of water, and dried and evaporated to ca. 150 ml. *in vacuo*.

This solution was run into vigorously stirred petroleum (b.p. 40 to 60°, 2.5 l.) to give the *iodomethyl* compound as an amorphous cream solid (44.4 g., 89%), m.p. 110 to 127° (decomp.), $[\alpha]_D^{23}$ −53.5° (c 1.0, CHCl₃), $\lambda_{max.}$ (EtOH) 282 nm. ($\epsilon$ 7,850).

(B) Diphenylmethyl (2'R,6R,7R) - 3 - (2,4-dinitrostyryl)-7-(2'-*t*-butoxycarbonylamino - 2' - phenylacetamido)-ceph-3-em-4-carboxylate, *Z-isomer* (with *E-isomer*)

A solution of diphenylmethyl (2'R,6R,7R)-3-iodomethyl - 7 - (2'-*t*-butoxycarbonylamino-2'-phenylacetamido)-ceph-3-em-4-carboxylate (2.958 g., 4 mmole) in dry methylene chloride (50 ml.) was stirred in the dark at 23°, and a solution of triphenylphosphine (1.574 g., 6 mmole) in methylene chloride (25 ml.) added, dropwise, over 5 minutes. The solution was stirred for a further 1 hour, and then added, dropwise, over 15 minutes, to a vigorously stirred mixture of 2,4-dinitrobenzaldehyde (2.353 g., 12 mmole) in methylene chloride (50 ml.) and saturated sodium bicarbonate:water=1:1 (50 ml.). After stirring for a further 40 minutes, the organic phase was separated, washed with brine (50 ml.), concentrated to ca. 25 ml., and purified by chromatography on kieselgel (100 g.), with methylene chloride (ca. 1 l.), followed by chloroform (ca. 1 l.) as eluents.

Evaporation of the chloroform eluate gave a foam (3.43 g.), which was dissolved in benzene (10 ml.), and this solution further purified by chromatography on kieselgel (80 g.), with benzene:ethyl acetate=10:1 as eluent. Fractions with $R_f$ ca. 0.5 (System D) were combined and evaporated *in vacuo*, the residual foam (1.74 g., 55%) dissolved in ethyl acetate, and the solution run into petroleum ether to give the *title ester* as an amorphous, yellow solid (1.489 g., 47%), m.p. 112 to 119° (decomp.), $[\alpha]_D^{23}$ −316° (c 1.08, CHCl₃), $\lambda_{max.}$ (EtOH) 282 nm. ($\epsilon$ 11,200), and 368 nm. ($\epsilon$ 12,100), the PMR spectrum (CDCl₃) indicated that this material was a mixture (ca. 85:15) of *Z*- and *E-isomers*. $R_f$ 0.51 (System D), and 0.35 (System F).

(C), (2'R,6R,7R)-7-(2'-Amino-2'-phenylacetamido) - 3-(2,4-dinitrostyryl)-ceph-3-em-4-carboxylic acid, *trifluoroacetic acid salt*, *E-isomer*

A solution of diphenylmethyl (2'R,6R,7R)-3-(2,4-dinitrostyryl) - 7 - (2'-*t*-butoxycarbonylamino-2'-phenylacetamido) - ceph - 3-em-4-carboxylate, *Z-isomer* (with ca. 15% *E-isomer*) (1.30 g., 1.64 mmole) in a mixture of trifluoroacetic acid (10 ml.) and anisole (2.5 ml.) was kept at 25° for 5 minutes, and the solvents removed at 40° (2 mm.).

Ethyl acetate (20 ml.) was added, the solution evaporated *in vacuo*, and the residue triturated with ether (20 ml.) to give the *trifluoroacetic acid salt* as a yellow solid (998 mg., 95%), m.p. 156 to 163° (decomp.), $\lambda_{max.}$ (EtOH) 280 nm. ($\epsilon$ 10,000), and 387 nm. ($\epsilon$ 13,100); the PMR spectrum (DMSO-d₆) included $\tau$ 2.33 and 2.82 (CH=CH, two doublets, J 16 Hz.), 4.80 (C₍₆₎—H, doublet, J 5 Hz.), and 6.07 and 6.37 (C₍₂₎—H, AB-quartet, $J_{AB}$ 18 Hz.).

EXAMPLE 3

(A) Diphenylmethyl (6R,7R) - 3-(4-Nitrostyryl)-7-(2-thienylacetamido) - ceph - 3-em-4-carboxylate, *Z*- and *E-isomers*

(a) A solution of 4 - nitrobenzaldehyde (1.2 g., 16 mmole) in methylene chloride (100 ml.) was stirred in the dark at 23° with saturated sodium bicarbonate:water =1:1 (100 ml.), and (6R,7R)-[4-diphenylmethoxycarbonyl - 7 - (2-thienylacetamido)-ceph-3-em-4-ylmethyl] triphenylphosphonium iodide (1.786 g., 2 mmole) added in portions, over 20 minutes.

After stirring for a further 40 minutes, the organic layer was separated, washed with brine (100 ml.), dried, concentrated to ca. 20 ml., and purified by chromatography on kieselgel (120 g.), with methylene chloride (1 l.), followed by chloroform (1 l.) as eluents. Evaporation of the chloroform eluate gave a foam (1.46 g.), which was dissolved in benzene (10 ml.), and this solution further purified by chromatography on kieselgel (30 g.), with benzene: ethyl acetate=10:1 as eluent.

Fractions with $R_f$ ca. 0.5 (System D) were combined and evaporated in vacuo to an oily solid (900 mg., 70.6%). This solid was digested with methanol (50 ml.) to give the E-isomer as yellow needles (175 mg., 13.7%), m.p. 239 to 242° (decomp.), $[\alpha]_D^{23}$ −177° (c 0.94, CHCl$_3$), $\lambda_{max}$. (EtOH) 368 nm. ($\epsilon$ 27,300), inflexions at 295 nm. ($\epsilon$ 8,300), and 235 nm. ($\epsilon$ 20,300), $R_f$ 0.52 (System D), 0.70 (System E), and 0.60 (System F).

The mother-liquor was evaporated in vacuo, the residue dissolved in ethyl acetate, and the solution run into petroleum ether to give the Z-isomer as a pale-yellow, amorphous solid (480 mg., 37.6%), m.p. 85 to 91° (decomp.), $[\alpha]_D^{23}$ −435° (c 0.81, CHCl$_3$), $\lambda_{max}$. (EtOH) 344 nm. ($\epsilon$ 13,500), and 283 nm. ($\epsilon$ 10,800), inflexion at 235 nm. ($\epsilon$ 18,600). $R_f$ 0.52 (System D), 0.70 (System E), and 0.60 (System F). (b) A solution of 4-nitrobenzaldehyde (3.0 g., 20 mmole) in dry methylene chloride (100 ml.) was stirred at 23°, and diphenylmethyl (6R,7R)-3-triphenylphosphoranylidene-methyl - 7 - (2-thienylacetamido)-ceph-3-em-4-carboxylate (3.83 g., 5 mmole) added, in portions, over 1 hour. After stirring for a further 1 hour, the solution was concentrated to ca. 25 ml., and purified by chromatography on kieselgel (100 g.), with chloroform as eluent.

The eluate was evaporated in vacuo, the residue dissolved in ethyl acetate (100 ml.), the solution washed with saturated sodium bicarbonate (2× 100 ml.), water (2× 100 ml.), and brine (100 ml.), dried, and evaporated to an oily solid (7.91 g.). This solid was dissolved in benzene (80 ml.), and the solution further purified by chromatography on kieselgel (160 g.), with benzene:ethyl acetate=10:1 as eluent.

Combination of fractions with $R_f$ ca. 0.5 (System D) gave a foam (2.05 g., 64%), which was dissolved in ethyl acetate and the solution run into petholeum ether to give the title ester as a yellow, amorphous solid (1.64 g., 51.5%), m.p. 90 to 95° (decomp.), $[\alpha]_D^{23}$ −425° (c 0.69, CHCl$_3$), $\lambda_{max}$. (EtOH) 361 nm. ($\epsilon$ 18,700), inflexions at 283 nm. ($\epsilon$ 18,900), and 235 nm. ($\epsilon$ 18,700); the PMR spectrum (CDCl$_3$) indicated that this material was a mixture (ca. 3:1) of Z− and E-isomers, with signals at $\tau$ 3.40 (CH=CH), and 6.68 and 7.01 (C$_{(2)}$—H) for the Z-isomer, and at $\tau$ 2.48 and 3.35 (CH=CH), and 6.29 and 6.50 (C$_{(2)}$—H for the E-isomer.

(B) 3-(4-Nitrostyryl)-(6R,7R)-7-(2-thienylacetamido)-ceph-3-em-4-carboxylic acid, E-isomer Diphenylmethyl (6R,7R) - 3-(4-nitrostyryl)-7-(2-thienylacetamido) - ceph - 3-em-4-carboxylate, E-isomer (303 mg., 0.475 mmole) was treated with trifluoroacetic acid (1.2 ml.) and anisole (0.3 ml.) and after 5 minutes, the reagents evaporated at 40° (2 mm.). The residue was dissolved in ethyl acetate (100 ml.), the solution extracted with aqueous sodium bicarbonate solution (300 ml., 2× 50 ml.), the extract covered with ethyl acetate (200 ml.), and acidified (to pH 2) with 2N-hydrochloric acid. The organic phase was separated, washed with water (50 ml.), and brine (50 ml.), dried and evaporated to a solid (145 mg., 65%).

Trituration of this solid with ether (20 ml.) gave the acid as yellow plates (95 mg., 42%), m.p. 173 to 191° (decomp.), $[\alpha]_D^{23}$ −42° (c. 0.75 acetone), $\lambda_{max}$. (0.1M-pH 6 phosphate buffer) 233 nm. ($\epsilon$ 16,200), and 375 nm. ($\epsilon$ 21,600), inflexion at 300 nm. ($\epsilon$ 10,000); $\lambda_{max}$. (EtOH) 232 nm. ($\epsilon$ 16,100), and 372.5 nm. ($\epsilon$ 22,600), inflexion at 291 nm. ($\epsilon$ 8,200); the PMR spectrum (DMSO-d$_6$) included $\tau$ 2.32 and 2.84 (CH=CH, two doublets, J 16 Hz), 4.76 (C$_{(6)}$—H, doublet J 5 Hz.), and 5.88 and 6.26 (C$_{(2)}$—H, AB-quartet, $J_{AB}$ 18 Hz.). $R_f$ 0.55 (System B), and 0.81 (System C).

(C) (6R,7R) - 3 - (4 - Nitrostyryl)-7-(2-Thienylacetamido) - ceph - 3 - em-4-carboxylic acid, Z-isomer (with E-isomer)

A solution of diphenylmethyl (6R,7R) - 3 - (4-nitrostyryl) - 7 - (2 - thienylacetamido)-ceph-3-em-4-carboxylate, Z-isomer (1.27 g., 1.99 mmole) in a mixture of trifluoroacetic acid (5 ml.) and anisole (1.3 ml.) was kept at ca. 23° for 5 minutes, the solvents were removed at 40° (2 mm.), and the residue partitioned between ethyl acetate (100 ml.) and saturated sodium bicarbonate: water=1:1 (100 ml.). The aqueous phase was separated, acidified (to pH 2) with 2N-hydrochloric acid, extracted with ethyl acetate (150 ml.), the extract washed with water (100 ml.), and brine (100 ml.), dried, and evaporated in vacuo.

The residual foam (875 mg., 93%) was dissolved in ethyl acetate, and the solution run into petroleum ether to give the acid as a pale-yellow, amorphous solid (715 mg., 76%), m.p. 95 to 110° (decomp.), $[\alpha]_D^{23}$ −307° (c 1.15, dioxan), $\lambda_{max}$. (EtOH) 232.5 nm. ($\epsilon$ 16,700), 288 nm. ($\epsilon$ 11,100), and 371 nm. ($\epsilon$ 17,600), $\lambda_{max}$. (0.1M-pH 6 phosphate buffer) 231.5 nm. ($\epsilon$ 18,300), 284.5 nm. ($\epsilon$ 13,100), and 355 nm. ($\epsilon$ 12,400); the PMR spectrum (DMSO-d$_6$) indicated that this material was a mixture (ca. 1:1) of Z- and E-isomers, with signals at $\tau$ 3.26 (CH=CH, singlet), 4.76 (C$_{(6)}$—H, doublet, J 5 Hz.), and 6.37 and 6.80 (C$_{(2)}$—H, AB-quartet, $J_{AB}$ 18 Hz.) for the Z-isomer, and at $\tau$ 2.32 and 2.84 (CH=CH), and 5.88 and 6.26 (C$_{(2)}$—H) for the E-isomer. $R_f$ 0.55 (System B), and 0.81 (System C).

EXAMPLE 4

(A) Diphenylmethyl (2′R,6R,7R) - 3 - (4-Nitrostyryl)- 7 - (2′ - t-butoxycarbonylamino-2′-phenylacetamido)- ceph - 3 - em-4-carboxylate, Z-isomer (with E-isomer).

A solution of diphenylmethyl (2′R,6R,7R)-3-iodomethyl - 7 - (2′-t-butoxycarbonylamino-2′-phenylacetamido)-ceph-3-em-4-carboxylate (1.479 g., 2 mmole) in dry methylene chloride (20 ml.) was stirred in the dark at 23°, and a solution of triphenylphosphine (787 mg., 3 mmole) in methylene chloride (10 ml.) added, dropwise, over 5 minutes. The solution was stirred for a further 90 minutes, and added, dropwise, to a vigorously stirred mixture of 4-nitrobenzaldehyde (1.2 g., 8 mmole) in methylene chloride (50 ml.) and saturated sodium bicarbonate:water=1:1 (50 ml.). After stirring for a further 40 minutes, the organic phase was separated, washed with brine (50 ml.), dried, and evaporated to an oily solid (3.33 g.).

A solution of this solid in methylene chloride (10 ml.) was purified by chromatography on kieselgel (100 g.), with methylene chloride (ca. 1 l.) followed by chloroform (ca. 1.5 l.) as eluents. Evaporation of the chloroform eluate gave a foam (1.65 g.), which was dissolved in benzene (10 ml.), and this solution further purified by chromatography on kieselgel (32 g.), with benzene: ethyl acetate=10:1 as eluent.

Combination of fractions with $R_f$ ca. 0.5 (System D) gave a foam (669 mg., 45%), which was dissolved in ethyl acetate, and the solution run into petroleum ether to give the ester as a pale-yellow, amorphous solid (570 mg., 38%), m.p. 111 to 118° (decomp.), $[\alpha]_D^{23}$ −329° (c 0.92, CHCl$_3$), $\lambda_{max}$. (EtOH) 285 nm. ($\epsilon$ 9,000), and 359 nm. ($\epsilon$ 18,600); the PMR spectrum (CDCl$_3$) indicated that this product was a mixture (ca. 7:3) of Z- and E-isomers. $R_f$ 0.52 (System D), and 0.40 (System F).

(B) 3-(4-Nitrostyryl)-(2′R,6R,7R) - 7 - (2′-Amino-2′-phenylacetamido)-ceph-3-em - 4 - carboxylic acid, trifluoroacetic acid salt (E-isomer)

A solution of diphenylmethyl (2′R,6R,7R) - 3 - (4-nitrostyryl) - 7 - (2′-t-butoxycarbonylamino-2′-phenylacetamido) - ceph - 3 - em-4-carboxylate (Z:E=7:3, 500 mg., 0.67 mmole) in a mixture of trifluoroacetic acid (4 ml.) and anisole (1 ml.) was kept at 23° for 5 minutes, the solvents removed at 40° (2 mm.), and the residue triturated with ether (20 ml.) to give the *trifluoroacetic acid salt* as a yellow solid (350 mg., 88%), m.p. 153 to 156° (decomp.), $[\alpha]_D^{23}$ —212° (c 0.9, dioxan), $\lambda_{max.}$ (EtOH) 290 nm. ($\epsilon$ 9,450), and 372.5 nm. ($\epsilon$ 18,400); the PMR spectrum (DMSO-$d_6$) included $\tau$ 2.48 and 2.90 (CH=CH, two doublets, J 16 Hz.), 4.83 ($C_{(6)}$—H, doublet, J 5 Hz.) and 6.02 and 6.40 ($C_{(2)}$—H, AB-quartet, $J_{ab}$ 18 Hz.).

EXAMPLE 5

(A) Diphenylmethyl (6R,7R) - 3 - (4-Cyanostyryl)-7-(2-thienylacetamido) - ceph - 3-em-4-carboxylate, Z- and E-isomers A solution of 4 - cyanobenzaldehyde (6.56 g., 50 mmole) in dry methylene chloride (250 ml.) was stirred at 23°, and diphenylmethyl (6R,7R) - 3 - (triphenylphosphoranylidenemthyl) - 7 - (2 - thienylacetamido) - ceph-3-em - 4 - carboxylate (3.825 g., 5 mmole) added, in portions, over 2 hours. The solution was stirred for a further 16 hours, concentrated to ca. 25 ml., and purified by chromatography on kieselgel (120 g.), with methylene chloride (ca. 2 l.), followed by chloroform (ca. 2 l.) as eluents.

Evaporation of the chloroform eluate gave a foam (4.15 g.), which was dissolved in benzene (20 ml.), and this solution further purified by chromatography on kieselgel (90 g.), with benzene:ethyl acetate=10:1 as eluent. Fractions with $R_f$ ca. 0.45 (System D) were combined and evaporated *in vacuo* to a pale-yellow solid (2.016 g., 65%). This solid was digested with warm methanol (50 ml.), the suspension cooled to ca. 23°, and the solids filtered off and dried *in vacuo* to give the *E-isomer* as colourless needles (615 mg., 20%), m.p. 235 to 237° (decomp.), $[\alpha]_D^{23}$ —194° (c 0.83, CHCl$_3$), $\lambda_{max.}$ (EtOH) 346.5 nm. ($\epsilon$ 33,100), inflexions at 257 nm. ($\epsilon$ 11,200) and 235 nm. ($\epsilon$ 19,200). $R_f$ 0.46 (System D), and 0.58 (System F).

The mother-liquor was evaporated *in vacuo*, the residue dissolved in ethyl acetate, and the solution run into petroleum ether to give the *Z-isomer* as an amorphous, colourless solid (1.15 g., 38%), m.p. 91 to 97° (decomp.), $[\alpha]_D^{23}$ —47.2° (c 0.91, CHCl$_3$), $\lambda_{max.}$ (EtOH) 326 nm. ($\epsilon$ 14,800), and 258 nm. ($\epsilon$ 12,900), inflexion at 235 nm. ($\epsilon$ 19,100). $R_f$ 0.46 (System D), and 0.58 (System F).

(B) (6R,7R-3-(4-Cyanostyryl)-7-(2-thienylacetamido)-ceph-3-em-4-carboxylic *acid E-isomer*

A solution of diphenylmethyl (6R,7R) - 3-(4-cyanostyryl) - 7 - (2-thienylacetamido) - ceph - 3-em-4-carboxylate, E-isomer (534 mg., 0.864 mmole) in trifluoroacetic acid (2 ml.) and anisole (0.5 ml.) was kept at ca. 23° for 5 minutes, the solvents evaporated at 40° (2 mm.), ethyl acetate (10 ml.) added, and the resulting suspension evaporated *in vacuo*.

The residue was triturated with ether (25 ml.) to give the *acid* as yellow needles (368 mg., 94%), m.p. 118 to 129° (decomp.), $[\alpha]_D^{23}$ —38° (c. 1.05, acetone) $\lambda_{max.}$ (EtOH) 234.5 nm. ($\epsilon$ 16,800), and 347 nm. ($\epsilon$ 29,300), inflexion at 256 nm. ($\epsilon$ 10,100); the PMR spectrum (DMSO-$d_6$) included $\tau$ 2.38 and 2.86 (CH=CH; two doublets, J 16 Hz.), and 5.90 and 6.28 ($C_{(2)}$—H, AB-quartet, $J_{AB}$ 18 Hz.). $R_f$ 0.41 (System B), and 0.86 (System C).

(C) (6R,7R) - 3 - (4 - Cyanostyryl - 7 - (2 - Thienylacetamido)-ceph-3-em-4-carboxylic *acid, Z-isomer*

A solution of diphenylmethyl (6R,7R) - 3 - (4-cyanostyryl) - 7 - (2-thienylacetamido) - ceph-3-em-4 - carboxylate, Z-isomer (1.0 g., 1.62 mmole) in a mixture of trifluoroacetic acid (4 ml.) and anisole (1 ml.) was kept at ca. 23° for 2 minutes, and the solvents removed at 40° (2 mm.). The residue was partitioned between ethyl acetate (50 ml.) and saturated sodium bicarbonate:water=1:1 (50 ml.); the aqueous phase was separated, acidified (to pH 2) with 2N-hydrochloric acid, and extracted with ethyl acetate (100 ml., 25 ml.). The extract was washed with water (50 ml.), and brine (50 ml.), dried, and evaporated *in vacuo*.

The residual foam (763 mg.) was dissolved in ethyl acetate, and the solution run into petroleum ether to give the *acid* as a pale-yellow, amorphous solid (594 mg., 81%), m.p. 89 to 102° (decomp.), $[\alpha]_D^{23}$ —354° (c. 1.18, dioxan), $\lambda_{max.}$ (0.1M-pH 6 phosphate buffer) 233 nm. ($\epsilon$ 18,800), and 320 nm. ($\epsilon$ 14,100), inflexion at 255 nm. ($\epsilon$ 14,000), $\lambda_{max.}$ (EtOH) 234 nm. ($\epsilon$ 17,900), and 322.5 nm. ($\epsilon$ 14,400), inflexion at 260 nm. ($\epsilon$ 10,400), the PMR spectrum (DMSO-$d_6$) included $\tau$ 3.32 (CH=CH, singlet), 4.76 ($C_{(6)}$—H, doublet, J 5 Hz.), and 6.40 and 6.82 ($C_{(2)}$—H, AB-quartet, $J_{AB}$ 18 Hz.). $R_f$ 0.41 (System B), and 0.86 (System C).

EXAMPLE 6

(A) Diphenylmethyl (6R,7R) - 7 - Amino - 3 - (2,4-dinitrostyryl) - ceph - 3 - em - 4 - carboxylate, *Z-isomer* (with E-isomer)

A solution of pyridine (0.58 ml., 7.2 mmole) in dry methylene chloride (5 ml.) was added, over 5 minutes, to a stirred solution of phosphorus pentachloride (1.5 g., 7.2 mmole) in dry methylene chlorine (20 ml.). After stirring for a further 5 minutes, the warm suspension was cooled, and a solution of diphenylmethyl (6R,7R)-3-(2,4-dinitrostyryl) - 7 - (2 - thienylacetamido) - ceph - 3 - em-4-carboxylate (*Z-isomer*, with ca. 20% *E-isomer*) (2.5 g., 3.66 mmole) in methylene chloride (25 ml.) added, dropwise, over 10 minutes, maintaining the temperature at ca. 0°.

Stirring was continued for a further 2 hours, during which time the temperature was allowed to rise to ca. 23°, the solution poured into a cooled (ca. 10°) mixture of methanol (15 ml.) and methylene chloride (20 ml.), the resulting solution stirred for 15 minutes, washed with N-hydrochloric acid (50 ml.), and stirred for 30 minutes with saturated sodium bicarbonate (100 ml.). The organic phase was separated, washed with saturated sodium bicarbonate (50 ml.), and brine (50 ml.), dried, and evaporated *in vacuo*.

The residual oil was dissolved in chloroform, and the solution run into petroleum ether to give the *amine* as an orange solid (1.332 g., 65.3%), m.p. 117 to 127° (decomp.), $[\alpha]_D^{20}$ —356° (c. 1.11, CHCl$_3$), $\lambda_{max.}$ (CHCl$_3$) 286.5 nm. ($\epsilon$ 10,800), and 375 nm. ($\epsilon$ 12,000); the PMR spectrum (DMSO-$d_6$) indicated that this material was a mixture (ca. 3:1) of *Z*- and *E-isomers*. $R_f$ 0.43 (System E), M 5.2 cm.

(B) Diphenylmethyl (6R,7R)-3-(2,4-Dinitrostyryl)-7-(1-naphthoylamino) - ceph-3-em-4-carboxylate, *Z-isomer* (with *E-isomer*).

A solution of diphenylmethyl (6R,7R)-7-amino-3-(2,4-dinitrostyryl)-ceph-3-em-4-carboxylate, *Z-isomer* (with ca. 25% E-isomer) (1.117 g., 2 mmole) in dry N,N-dimethylformamide (20 ml.) was stirred at 23°, and treated, over 10 minutes, with a solution of 1-naphthoyl chloride (420 mg., 2.2 mmole) in dry acetonitrile (10 ml.). After stirring for a further 1 hour, the solvents were removed at 40° (2 mm.), the residue dissolved in ethyl acetate (100 ml.), the solution washed with saturated sodium bicarbonate (2× 50 ml.), water (50 ml.), and brine (50 ml.), dried, and evaporated to a foam (1.565 g.). This material was dissolved in benzene (10 ml.), and the solution purified by chromatography on kieselgel (32 g.), with benzene:ethyl acetate=10:1 as eluent. Fractions with $R_f$ ca. 0.6 and 0.5 (System D) were combined and evaporated *in vacuo*, and the residual solid (900 mg., 63%) triturated with ether (25 ml.) to give the *ester* as orange prisms (725 mg., 51%), m.p. 124 to 148° (decomp.), $[\alpha]_D^{23}$ —331° (*c*. 1.12, $CHCl_3$), $\lambda_{max.}$ (EtOH) 281.5 nm. ($\epsilon$ 16,600), and 373 nm. ($\epsilon$ 15,000); the PMR spectrum ($CDCl_3$) indicated that this material was a mixture (*ca*. 7:3) of *Z*- and *E-isomers*, $R_f$ 0.58 and 0.51 (*Z*- and *E-isomers*) respectively (System D), and $R_f$ 0.51 (System F).

(C) (6R,7R)-3-(2,4-Dinitrostyryl)-7-(1-naphthoyl-amino)-ceph-3-em-4-carboxylic *Acid, E-isomer*

A solution of diphenylmethyl (6R,7R)-3-(2,4-dinitrostyryl)-7-(1 - naphthoylamino)-ceph-3-em-4-carboxylate, *Z-isomer* (with *ca*. 25% *E-isomer*) (600 mg., 0.84 mmole) in a mixture of trifluoroacetic acid (2.4 ml.) and anisole (0.6 ml.) was kept at 23° for 5 minutes, and the solvents removed at 40° (2 mm.). Ethyl acetate (20 ml.) was added, the resulting solution evaporated *in vacuo*, and the residue triturated with ether (20 ml.) to give the *acid* as a dark-orange solid (325 mg., 70.5%), m.p. 136 to 145° (decomp.) $[\alpha]_D^{23}$ —312° (*c*. 0.49, acetone), $\lambda_{max.}$ (EtOH) 282 nm. ($\epsilon$ 15,700), and 390 nm. ($\epsilon$ 14,200); the PMR spectrum (DMSO-$d_6$) included 2.72 (CH=C$\underline{H}$, doublet, J 16 Hz.), 4.58 ($C_{(6)}$—H, doublet, J 5 Hz.), and 5.91 and 6.21 ($C_{(2)}$—H, AB-quartet, $J_{AB}$ 18 Hz.). $R_f$ 0.55 (System B), and 0.78 (System C).

EXAMPLE 7

(A) Diphenylmethyl (6R,7R) - 3 - (2,4-Dinitrostyryl)-7-[(Z)-2-hydroximino - 2 - phenylacetamido]-ceph-3-em-4-carboxylate, *Z-isomer* (with *E-isomer*)

A solution of diphenylmethyl (6R,7R)-7-amino-3-(2,4-dinitrostyryl)-ceph-3-em-4-carboxylate, *Z-isomer* (with *ca*. 25% *E-isomer*) (1.117 g., 2 mmole) prepared as in Example 6 (A) and propylene oxide (0.57 ml.) in dry ethyl acetate (10 ml.) was stirred at 23°, and treated, over 10 minutes, with a *M*-solution of (Z)-2-dichloroacetoxyimino-phenyl acetyl chloride in ethyl acetate (2 × 4 ml., *ca*. 1.2 equiv.). After stirring for a further 45 minutes, the solution was washed with 2N-hydrochloric acid (20 ml.), and saturated sodium bicarbonate (20 ml.), dried, and evaporated to a foam (1.892 g.). This material was dissolved in benzene (5 ml.), and the solution purified by chromatography on kieselgel (60 g.), with benzene:ethyl acetate=10:1 as eluent. Fractions with $R_f$ *ca*. 0.4 (System D) were combined and evaporated *in vacuo*, the residual foam (999 mg., 70.7%) was dissolved in ethyl acetate, and the solution run into petroleum ether to give the *ester* as an amorphous, orange solid (886 mg., 67%), m.p. 114 to 122° (decomp.), $[\alpha]_D^{20}$ —343° (*c*. 0.96, $CHCl_3$), $\lambda_{max.}$ (EtOH) 372 nm. ($\epsilon$ 13,200), inflexion at 240 nm. ($\epsilon$ 23,600); the PMR spectrum ($CDCl_3$) indicated that this material was a mixture (*ca*. 4:1) of *Z*- and *E-isomers*. $R_f$ 0.36 (System D), and 0.12 (System F).

(B) (6R,7R)-3-(2,4-Dinitrostyryl) - 7 - [(Z)-2-hydroxyimino-2-phenylacetamido]-ceph-3-em-4-carboxylic *acid, E-isomer*

A solution of the ester described in (A) above (715 mg., 1.01 mmole) in trifluoroacetic acid (2.88 ml.) and anisole (0.72 ml.) was kept at 23° for 4 minutes, and the solvents removed at 40° (2 mm.). The residue was dissolved in ethyl acetate (20 ml.), the solution washed with 2N-hydrochloric acid (15 ml.), water (15 ml.), and brine (20 ml.), dried, and evaporated *in vacuo*. Trituration of the residue with ether (50 ml.) gave the *acid* as a dark-orange solid (242 mg, 44.5%), m.p. 165 to 173° (decomp.), $[\alpha]_D^{20}$ —236.5° (*c*. 0.9, dioxane), $\lambda_{max.}$ (EtOH) 244 nm. ($\epsilon$ 24,700), and 389 nm. ($\epsilon$ 14,100); the PMR spectrum (DMSO-$d_6$) included $\tau$ 2.72 (CH=C$\underline{H}$, doublet, J 16 Hz.), 4.64 ($C_{(6)}$—H, doublet, J 5 Hz.), and 5.96 6.25 ($C_{(2)}$—H, AB-quartet, $J_{AB}$ 18 Hz.). $R_f$ 0.54 (System B), and 0.78 (System C). This sample contained a small amount of an acidic impurity, which ran as a red spot, $R_f$ *ca*. 0.10 (System C).

EXAMPLE 8

(A) Diphenylmethyl (1S,6R,7R)-3-(2,4-Dinitrostyryl)-7-(2-thienylacetamido)ceph-3-em-4-carboxylate, 1-oxide, *Z-isomer* (with *E-isomer*).

A solution of *meta*-chloroperbenzoic acid (610 mg., ca. 3 mmole) in dry methylene dichloride (25 ml.) was added, over 5 minutes, to a stirred solution of diphenylmethyl (6R,7R) - 3 - (2,4-dinitrostyryl)-7-(2-thienylacetamido)ceph-3-em-4-carboxylate (*Z-isomer*), with *ca*. 15% *E-isomer*, prepared as described in Example 1(A)(b) (1,365 g., 2 mmole) in methylene dichloride (25 ml.). After stirring for a further 15 minutes, the solution was washed with saturated sodium bicarbonate (2× 25 ml.), water (2× 25 ml.), and brine (25 ml.), and treated with some charcoal. The suspension was filtered through a kieselguhr pad, and the filtrate dried and the solvent evaporated *in vacuo*. The residual solid (1.42 g.) was triturated with ether (25 ml.) to give the *title oxide* as yellow prisms (1.25 g., 89.5%), m.p. 125 to 132° (decomp.), $[\alpha]_D^{20}$ —428° (*c*. 1.23, $CHCl_3$), $\lambda_{max.}$ (EtOH) 276 nm. ($\epsilon$ 11.700) and 360 nm. ($\epsilon$ 12,700), inflexion at 235 nm. ($\epsilon$ 24,000); the PMR spectrum (DMSO-$d_6$) indicated that this material was a mixture (*ca*. 85:15) of *Z*- and *E-isomers*. $R_f$ 0.44 (System E).

(B) (1S,6R,7R) - 3 - (2,4 - Dinitrostyryl)-7-(2-thienylacetamido)ceph - 3 - em-4-carboxylic acid, 1-oxide, *E-isomer*

A solution of diphenylmethyl (1S,6R,7R) - 3 - (2,4-dinitrostyryl)-7-(2-thienylacetamido)ceph - 3 - em-4-carboxylate, 1-oxide (*Z-isomer*, with *ca*. 15% *E-isomer*) (1.0 g., 1.43 mmole) in a mixture of trifluoroacetic acid (4 ml.) and anisole (1 ml.) was kept at 23° for 5 minutes, and the solvents were removed at 40° (2 mm.). Ethyl acetate (20 ml.) was added, the resulting suspension evaporated to dryness *in vacuo*, and the residue triturated with ether (25 ml.) to give the *acid* as a yellow solid (690 mg., 90.5%), m.p. 144 to 150° (decomp.), $[\alpha]_D^{22}$ —300° (*c*. 0.94, acetone), $\lambda_{max.}$ (EtOH) 230 nm. ($\epsilon$ 24,200), 285 nm. ($\epsilon$ 9,700), and 376 nm. ($\epsilon$ 19,900); the PMR spectrum (DMSO-$d_6$) included $\tau$ 2.22 and 2.73 (CH=CH, two doublets, J 16 Hz.), 4.94 ($C_{(6)}$—H, doublet, J 5 Hz.), and 5.56 and 6.33 ($C_{(2)}$—$H_2$, AB-quartet, $J_{AB}$ 18 Hz.). $R_f$ 0.46 (System B), and 0.65 (System C).

EXAMPLE 9

(A) Diphenylmethyl (6R,7R) - 3 - (2,4-Dinitrostyryl)-7-formamidoceph - 3 - em-4-carboxylate, *Z-isomer* (with *E-isomer*)

(a) A solution of diphenylmethyl (6R,7R)-3-bromomethyl-7-formamidoceph-3-em-4-carboxylate (975 mg., 2 mmole) and triphenylphosphine (800 mg., 3 mmole) in methylene dichloride (30 ml.) was stirred in the dark at 23° for 3 hours, and was then added, over 10 minutes, to a vigorously stirred solution of 2,4-dinitrobenzaldehyde (1.177 g., 6 mmole) in a mixture of methylene dichloride (50 ml.) and saturated sodium bicarbonate:water=1:1 (50 ml.). After stirring for a further 30 minutes, the organic phase was separated, washed with brine (50 ml.), concentrated to *ca*. 25 ml., and purified by chromatography on kieselgel (80 g.), with methylene dichloride (*ca*. 1 l.), followed by methylene dichloride:acetone=1:1 (*ca*. 1 l.) as eluents. Evaporation of the latter portion of eluate gave a foam (1.32 g.), which was dissolved in benzene (5 ml.), and this solution was further purified by chromatography on kieselgel (30 g.), with benzene:ethyl acetate =5:1 as eluent. Fractions with $R_f$ *ca*. 0.4 (System E) were combined and evaporated to dryness *in vacuo*, and the residual foam (640 mg., 54.5%) was triturated with ether (20 ml.) to give the *title ester* as an orange, grannular solid (485 mg., 41%), m.p. 118 to 124° (decomp.), $[\alpha]_D^{22}$ —350° (*c*. 0.8, $CHCl_3$), $\lambda_{max.}$ (EtOH) 279 nm. ($\epsilon$ 11,700), and 365 nm. ($\epsilon$ 12,700) [$\epsilon$ values calculated for $C_{29}H_{22}N_4O_8S$ (586.6), ½ $Et_2O$]; the PMR spectrum ($CDCl_3$) indicated that this material was a mixture (*ca.* 9:1) of *Z*- and *E*-isomers. $R_f$ 0.40 (System E).

(b) A suspension of diphenylmethyl (1S,6R,7R)-3-bromomethyl - 7 - formamidoceph-3-em-4-carboxylate, 1-oxide (503 mg., 1 mmole) in dry methylene dichloride (25 ml.) was stirred in the dark at 23°, and a solution of triphenylphosphine (525 mg., 2 mmole) in methylene dichloride (5 ml.) added. After stirring for 4 hours, the solution was added, over 5 minutes, to a vigorously stirred solution of 2,4-dinitrobenzaldehyde (589 mg., 3 mmole) in a mixture of methylene dichloride (50 ml.) and saturated sodium bicarbonate:water=1:1 (50 ml.). The mixture was stirred for a further 30 minutes, and the organic phase separated, washed with brine (50 ml.), concentrated to *ca.* 50 ml., and purified by chromatography on kieselgel (40 g.), with methylene dichloride (*ca.* 1 l.), followed by methylene dichloride:acetone=1:1 (*ca.* 500 ml.) as eluents. Evaporation of the latter portion of eluate gave a foam (880 mg.), which was dissolved in methylene dichloride (5 ml.), and this solution was further purified by chromatography on kieselgel (35 g.), with methylene dichloride:acetone=8:1 as eluent. Fractions with $R_f$ *ca.* 0.4 (t.l.c. Merck kieselgel $F_{254}$ plates, developed with methylene dichloride:acetone=4:1) were combined and evaporated to dryness *in vacuo*. The residual solid (720 mg.) was triturated with ether (30 ml.) to give *diphenylmethyl (1S,6R,7R)-3-(2,4 - dinitrostyryl)-7-formamidoceph-3-em-4-carboxylate, 1-oxide* as a yellow solid (445 mg., 74%), m.p. 115 to 125° (decomp.), $[\alpha]_D^{22}$ −383° (*c.* 0.82, $CHCl_3$), $\lambda_{max}$ (EtOH), 264.5 nm. ($\epsilon$ 10,400), 271.5 nm. ($\epsilon$ 10,200), and 363 nm. ($\epsilon$ 13,100); the PMR spectrum (DMSO-$d_6$) indicated that this material was a mixture (*ca.* 4:1) of *Z*- and *E*-isomers. A solution of the oxide (302 mg., 0.5 mmole) in dry methylene dichloride (20 ml.) was stirred at −20° and treated, over 5 minutes, with a solution of phosphorus tribromide (0.12 ml., *ca.* 2.5 equiv.) in methylene dichloride (5 ml.). The solution was stirred for a further 1 hour at −10 to −15° and then added, over 5 minutes, to cooled (0°) saturated sodium bicarbonate (25 ml.). The mixture was stirred for a further 30 minutes, during which time the temperature was allowed to rise to *ca.* 23°, and the organic phase was separated, washed with saturated sodium bicarbonate, water, and brine (25 ml. of each), treated with charcoal, filtered through a pad of kieselguhr, and dried and evaporated to a solid (240 mg.). A solution of this solid in ethyl acetate was run into petroleum ether to give the *title ester* as a yellow, amorphous solid (200 mg., 68%), m.p. 90 to 100° (decomp.). $[\alpha]_D^{22}$ −278° (*c.* 0.95, $CHCl_3$), $\lambda_{max}$ (EtOH), 285 nm. ($\epsilon$ 9,800), and 372 nm. ($\epsilon$ 14,500); the PMR spectrum ($CDCl_3$) indicated that this material was a mixture (*ca.* 2:1) of *Z*- and *E-isomers*. The I.R. spectrum, and chromatographic characteristics of this sample were similar to that described in (a) above.

(B) (6R,7R)-3-(2,4-Dinitrostyryl)-7-formamidoceph-3-em-4-carboxylic acid, *E-isomer*

A solution of diphenylmethyl (6R,7R)-3-(2,4-dinitrostyryl)-7-formamidoceph - 3 - em-4-carboxylate, *Z-isomer* (with *ca.* 15% *E-isomer*) (1.5 g., 2.56 mmole) in a mixture of trifluoroacetic acid (6 ml.) and anisole (1 ml.) was kept at 23° for 5 minutes, and the solvents were removed at 40° (2 mm.). Ethyl acetate (10 ml.) was added, the resulting suspension evaporated to dryness *in vacuo*, the residue dissolved in acetone (50 ml.), and charcoal (*ca.* 1 g.) added. The mixture was stirred for 10 minutes and filtered through a pad of kieselguhr, and the filtrate dried and evaporated to dryness *in vacuo*. The residue was triturated with ether (50 ml.) to give the *acid* as orange prisms (854 mg., 79.5%), m.p. 163 to 169° (decomp.), $[\alpha]_D^{24}$ −95° (*c* 1.14, acetone), $\lambda_{max}$ (EtOH) 290 nm. ($\epsilon$ 10,400) and 384 nm. ($\epsilon$ 18,500), $\lambda_{max}$ (0.1M-pH 6 phosphate buffer) 290.5 nm. ($\epsilon$ 12,300), and 388 nm. ($\epsilon$ 18,800); the PMR spectrum (DMSO-$d_6$) included $\tau$ 2.38 and 2.72 (CH=CH, two doublets, J 16 Hz.), 4.72 ($C_{(6)}$—H, doublet, J 5 Hz.), and 5.92 and 6.26 ($C_{(2)}$—$H_2$, AB-quartet, $J_{AB}$ 18 Hz.). $R_f$ 0.31 (System B), and 0.36 (System C).

EXAMPLE 10

Diphenylmethyl (6R,7R) - 3 - (2,4-Dinitrostyryl)-7-(2-thienylacetamido)ceph - 3-em-4-carboxylate, *Z-isomer* with *E-isomer*)

A suspension of diphenylmethyl (6R,7R)-3-(2,4-dinitrostyryl) - 7 - formamidoceph-3-em-4-carboxylate, *Z-isomer* with (*ca.* 15% *E-isomer*) (391 mg., 0.66 mole) in methanol (10 ml.) was stirred at 0°, and phosphorus oxychloride (0.13 ml., *ca.* 2 equivs.) was added, over 2 minutes. The mixture was stirred for a further 3 hours, during which time the temperature was allowed to rise to *ca.* 23°, and the solvent was removed by rotary evaporation. Ethyl acetate (10 ml.) was added, and the resulting solution evaporated to dryness *in vacuo*. The residue was dissolved in methylene dichloride, and the solution run into ether to give *diphenylmethyl (6R,7R)-7-amino-3-(2, 4-dinitrostyryl)ceph-3-em-4-carboxylate, hydrochloride* as an orange solid (351 mg., 88.5%), m.p. 128 to 136° (decomp.), $[\alpha]_D^{22}$ −279° (*c.* 0.95, $CHCl_3$), $\lambda_{max}$. (EtOH) 383.5 nm ($\epsilon$ 11,000), and 370 nm. ($\epsilon$ 14,700); the PMR spectrum (DMSO-$d_6$) indicated that this material was mainly the *Z-isomer*.

A solution of the *amine hydrochloride* (238 mg., 0.4 mmole) in methylene dicholride (20 ml.) was stirred for 20 minutes with saturated sodium bicarbonate (20 ml.). The organic phase was separated, washed with brine (10 ml.), and dried, and dicyclohexylcarbodiimide (104 mg., 0.5 mmole) was added. The resulting solution was stirred at *ca.* 23° and treated, over 5 minutes, with a solution of 2-thienylacetic acid (121 mg., 0.5 mmole) in methylene dichloride (15 ml.). After stirring for a further 30 minutes, the solid was filtered off, and the filtrate stirred for 30 minutes with saturated sodium bicarbonate: water=1:1 (50 ml.). The organic phase was separated, washed with saturated sodium bicarbonate, and brine (25 ml. of each), and dried and evaporated *in vacuo*. The residue was extracted with ethyl acetate (20 ml.), and the extract was run through a column of kieselgel (20 g.), with ethyl acetate as eluent. The eluate was evaporated to dryness *in vacuo*; the residual solid (290 mg.) was dissolved in ethyl acetate, and the solution run into petroleum ether to give the *title ester* as a pale-orange, amorphous solid (216 mg., 82.5%), m.p. 90 to 96° (decomp.), $[\alpha]_D^{22}$ −350° (*c.* 0.89, $CHCl_3$), $\lambda_{max}$. (EtOH) 282 nm. ($\epsilon$ 11,400), and 372 nm. ($\epsilon$ 14,200); the PMR spectrum ($CDCl_3$) indicated that this material was mainly the *Z-isomer*.

Example A: Formulation of test reagents (a) (6R,7R) - 3-(E-2,4-Dinitrostyryl)-7-(2-thienylacetamido)-ceph-3-em-4-carboxylic acid (50 mg.) was dissolved in dimethylformamide (5 ml.) and made up to 100 ml. with a phosphate buffer giving a pH of about 7.0.

(b) The solution from (a) above was impregnated into discs of pure cellulose paper of the type useful for paper chromatography. The discs were air-dried in an oven at 50° C. Sticks of pure cellulose were also impregnated and dried in like manner. The discs and sticks were stored in desiccators in the absence of light.

Example B

A penicillin-resistant strain of *Staph. aureus* was grown in broth for 18 hours at 37° C. Sufficient of the solution of Example A (a) was then added to give a concentration of reagent of 100 $\mu$g./ml.

A deep red colour rapidly developed and spectroscopic examination showed the appearance of a broad absorption band at 485 nm. Simultaneously an absorption band at 388 nm. decreased in intensity.

The colour was stable for at least 24 hours. When the test was repeated with a solution (prepared as in Example A (a) of the product of Example 5(B) a green colour was observed.

Example C

The gram-negative organism *Enterobacter cloacae* P 99 and its mutant P 99 (M) were cultured on agar in Petri dishes.

When the colonies were fully developed, a few drops of the solution of Example A(a) was added to each plate. The colonies of P 99 gave an immediate pronounced red colour but the colonies of P 99 (M) gave no reaction. It is known that P 99 is a β-lactamase producing strain whereas P 99 (M) is not. The colour had faded after 3 hours.

Example D

*Staph. aureus* (penicillin-resistant) was cultured on an agar plate. When the colony was fully grown one of the impregnated discs of Example A(b) was dropped onto the colonies. It rapidly turned red.

We claim:

1. A method of testing a biological sample for β-lactamase activity which comprises contacting said sample in the presence of water with a reagent selected from the group consisting of compounds of formula

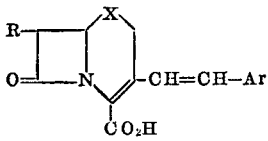

(I)

wherein R is an amino group or a blocked amino group, Ar is a carbocycle or 5- or 6-membered heterocycle, said heterocycle containing at least one heteroatom selected from O, N and S and said group Ar bearing at least one electron-withdrawing substituent in conjugation with the exocyclic —CH=CH— double bond, and X is —S—, —SO— (α or β) or —$SO_2$—, and salts and esters of such compounds and observing for the production of colour as an indication of the presence or degree of β-lactamase activity.

2. The method of claim 1 wherein Ar in formula (I) is an aromatic group bearing at least two electron-withdrawing groups.

3. The method of claim 2 wherein Ar in formula (I) is 2,4-dinitrophenyl or 2,-dinitrophenyl.

4. The method of claim 1 wherein said reagent is a compound having the *trans* configuration.

5. The method of claim 1 wherein the compound of formula I is (6R,7R)-3-(E-2,4-dinitrostyryl)-7-(2-thienylacetamido)ceph-3-em-4-carboxylic acid.

6. The method of claim 1 wherein said reagent is employed in the form of a solution thereof.

7. The method of claim 1 wherein said reagent is employed impregnated into a white or pale absorbent member.

References Cited

UNITED STATES PATENTS 2,601,350  6/1952  Welch _____ 195—103.5

ALVIN E. TANENHOLTZ, Primary Examiner

U.S. Cl. X.R.

260—240 D; 424—246